United States Patent
Larson et al.

(10) Patent No.: US 8,118,494 B2
(45) Date of Patent: Feb. 21, 2012

(54) REMOTE GRIP OPTICAL FIBER CONNECTOR

(75) Inventors: Donald K. Larson, Cedar Park, TX (US); Sidney J. Berglund, Round Rock, TX (US); Paul N. Winberg, Rollingwood, TX (US); James R. Bylander, Austin, TX (US); Takaya Yamauchi, Sagamihara (JP); Tomoyasu Oike, Sagamihara (JP); Yukino Miyoshi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 374 days.

(21) Appl. No.: 12/527,217

(22) PCT Filed: Feb. 7, 2008

(86) PCT No.: PCT/US2008/053292
§ 371 (c)(1),
(2), (4) Date: Aug. 14, 2009

(87) PCT Pub. No.: WO2008/100774
PCT Pub. Date: Aug. 21, 2008

(65) Prior Publication Data
US 2010/0098381 A1  Apr. 22, 2010

(51) Int. Cl.
*G02B 6/38* (2006.01)
(52) U.S. Cl. ............ 385/60; 385/62; 385/78; 385/80; 385/81; 385/95; 385/97; 385/98; 385/99

(58) Field of Classification Search .............. 385/53, 385/58, 60, 62, 65, 76, 77, 78, 81, 95, 96, 385/97, 98, 99, 80
See application file for complete search history.

(56) References Cited

U.S. PATENT DOCUMENTS

| | | | |
|---|---|---|---|
| 3,948,582 A | 4/1976 | Martin | 385/56 |
| 5,073,043 A | 12/1991 | DiMarco et al. | 385/81 |
| 5,189,717 A | 2/1993 | Larson et al. | 385/95 |
| 5,337,390 A | 8/1994 | Henson et al. | 385/81 |
| 5,363,461 A | 11/1994 | Bergmann | 385/78 |

(Continued)

FOREIGN PATENT DOCUMENTS

EP   0 262 765 A1   4/1988

(Continued)

OTHER PUBLICATIONS

Product Brochure, "Fiber Optic Polishing"; 3M Company, St. Paul, MN (Nov. 2005).

*Primary Examiner* — Brian Healy
(74) *Attorney, Agent, or Firm* — Gregg H. Rosenblatt

(57) ABSTRACT

An optical fiber connector comprises an outer housing configured to mate with a receptacle and a collar body disposed in the outer housing. The collar body receives and secures a ferrule in a first portion of the collar body. The ferrule includes a central bore that defines an axis. The ferrule further includes a fiber stub disposed in a portion of the central bore, the fiber stub comprising a first optical fiber having a first end proximate to an end face of the ferrule and a prepared second end terminating within the ferrule. The collar body further includes a second portion that includes a housing portion to house a gripping device that grips a second optical fiber.

19 Claims, 13 Drawing Sheets

U.S. PATENT DOCUMENTS

| | | | |
|---|---|---|---|
| 5,408,558 A | 4/1995 | Fan | 385/80 |
| 5,677,976 A | 10/1997 | Takahashi | 385/140 |
| 5,694,506 A | 12/1997 | Kobayashi et al. | 385/60 |
| 5,732,174 A | 3/1998 | Carpenter et al. | 385/72 |
| 5,761,360 A | 6/1998 | Grois et al. | 385/81 |
| 5,812,718 A | 9/1998 | Carpenter et al. | 385/97 |
| 5,909,528 A | 6/1999 | Tamekuni et al. | 385/137 |
| 5,993,070 A | 11/1999 | Tamekuni et al. | 385/65 |
| 6,045,271 A * | 4/2000 | Shimoji et al. | 385/85 |
| 6,599,029 B2 | 7/2003 | Yamazaki et al. | 385/80 |
| 6,918,704 B2 | 7/2005 | Marrs et al. | 385/78 |
| 7,011,454 B2 | 3/2006 | Caveney et al. | 385/87 |
| 7,140,787 B2 | 11/2006 | Yamauchi et al. | 385/98 |
| 7,140,950 B1 | 11/2006 | Bylander et al. | 451/42 |
| 7,331,718 B2 | 2/2008 | Yazaki et al. | 385/78 |
| 7,454,117 B2 | 11/2008 | Carpenter et al. | 385/137 |
| 2002/0097510 A1 | 7/2002 | Jokura | 359/811 |
| 2003/0077048 A1 | 4/2003 | Radek et al. | 385/81 |
| 2005/0063662 A1 | 3/2005 | Carpenter et al. | 385/136 |
| 2005/0094945 A1 | 5/2005 | Danley et al. | 385/78 |
| 2005/0123248 A1* | 6/2005 | Sakurai et al. | 385/78 |
| 2005/0141817 A1 | 6/2005 | Yazaki et al. | 385/78 |
| 2005/0244108 A1* | 11/2005 | Billman et al. | 385/60 |
| 2006/0165352 A1 | 7/2006 | Caveney et al. | 385/87 |
| 2006/0171639 A1 | 8/2006 | Dye | 385/78 |
| 2008/0118206 A1 | 5/2008 | Wagner et al. | 385/81 |
| 2010/0098381 A1* | 4/2010 | Larson et al. | 385/60 |
| 2010/0220960 A1* | 9/2010 | Ohtsuka et al. | 385/72 |

FOREIGN PATENT DOCUMENTS

| | | |
|---|---|---|
| EP | 0 862 072 A2 | 9/1998 |
| JP | 09-127367 | 5/1997 |
| JP | 09-127371 | 5/1997 |
| JP | 09-318836 | 12/1997 |
| JP | 10-227947 | 8/1998 |
| JP | 2001-235657 | 8/2001 |
| JP | 3317824 | 6/2002 |
| JP | 3445479 | 6/2003 |
| JP | 2004-252159 | 9/2004 |
| JP | 2004-317945 | 11/2004 |
| JP | 2005-114863 | 4/2005 |
| JP | 2006-178105 | 6/2006 |
| JP | 2006-195173 | 7/2006 |
| WO | WO 2005/073767 A1 | 8/2005 |
| WO | WO 2006/019515 | 2/2006 |
| WO | WO 2006/019516 | 2/2006 |

* cited by examiner

REMOTE GRIP OPTICAL FIBER CONNECTOR

BACKGROUND

1. Field of the Invention

The present invention is directed to an optical connector.

2. Related Art

Mechanical optical fiber connectors for the telecommunications industry are known. For example, LC, ST, FC, and SC optical connectors are widely used.

However, commercially available optical connectors are not well suited for outside plant field installations. Typically, an adhesive is required to mount these types of ferrule-based connectors on to an optical fiber. The process of bonding the fiber to the ferrule can be awkward and time consuming to perform in the field. Also post-assembly polishing requires that the craftsman have a higher degree of skill.

Remote grip optical fiber connectors are also known, such as those described in U.S. Pat. No. 5,337,390. These connectors employ a mechanical gripping element to secure the optical fiber as opposed to an adhesive.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

Also known are connectors that incorporate fiber stubs that are factory installed. In these connectors, the back end of the stub fiber is mechanically spliced to a field fiber, where an index matching gel is used to fill the gap between the back end of the fiber stub and the front end of the terminated fiber. For example, see U.S. Pat. No. 5,909,528. For outdoor applications, especially for environments that can undergo a wide temperature variation, the index of refraction of the gel may change as a function of temperature, leading to more reflections, thus limiting the connector performance in those particular applications.

Another alternative includes the use of a fusion splice to connect a field fiber to a fiber stub. For example, see JP Application No. 2004-317945. A fusion splice requires the use of expensive fusion splice machines.

SUMMARY OF THE INVENTION

According to a first aspect of the present invention, an optical fiber connector comprises an outer housing and a collar body disposed in the outer housing. The collar body receives and secures a ferrule in a first portion of the collar body. The ferrule includes a central bore that defines an axis. The ferrule further includes a fiber stub disposed in a portion of the central bore, the fiber stub comprising a first optical fiber having a first end proximate to an end face of the ferrule and a prepared second end terminating within the ferrule. The collar body further includes a second portion that includes a housing portion to house a gripping device that grips a second optical fiber.

In another aspect, the gripping device provides a contact force that is applied to the second optical fiber in an axial direction and provides optical contact with the second end of the first fiber inside the central bore.

In another aspect, the gripping device includes a gripping element and an actuating cap configured to engage the gripping element to secure a second optical fiber disposed therein. In one aspect, the gripping element comprises a ductile material having a focus hinge that couples two element legs, where the actuating cap includes a cam portion formed on a cap leg that engages a rear portion of collar body upon actuation, where each of the legs further includes slots formed at different axial positions and oriented transverse to the axis. In another aspect, the gripping element further includes one or more projections located on opposite longitudinal end portions of the legs, wherein, upon actuation of the actuating cap, a first projection contacts a rear portion of the ferrule and a second projection contacts a portion of the actuating cap. In one aspect, the contact force is from about 0.1 lbs. to about 0.4 lbs.

In another aspect, the actuating cap includes a cover portion and a main body portion that includes two main legs and two spring legs, wherein the main legs include cams disposed on inner surfaces thereof to engage and clamp the element about the second optical fiber when the cap is pressed onto the element during actuation. In one aspect, the main legs each include a forward shoulder portion to engage with a retaining wall portion of the collar body disposed between the gripping element and the ferrule. During actuation, the spring legs engage with a cam surface of an opposite portion of the collar body.

In another aspect, the ferrule includes a cut-out portion positioned at a generally midpoint axial location of the ferrule that provides a location to apply an adhesive to the central bore at a first portion of the ferrule.

In another aspect, the ferrule includes a slot formed generally transverse to the axis that receives at least one of a cleaning material and a polishing material that is applicable at least one of to the second end of the first fiber and an abutting end of the second fiber. In one aspect, the slot is oriented at an angle of about 5°-about 10° from normal to the axis.

In another aspect, the ferrule includes a through-hole intersecting and formed generally transverse to the central bore that receives at least one of a cleaning material and a polishing material that is applicable to at least one of the second end of the first fiber and an abutting end of the second fiber. In another aspect, the optical fiber connector further comprises a cable holding member that includes a cable clamping mechanism disposable therein. In one aspect, the cable holding member further includes a main body and a retention clip, where the retention clip is configured to engage a portion of the main body of the cable holding member and secure the clamping mechanism, and where the clamping mechanism includes a receptive groove formed therein having engaging projections configured to securely retain the outer portion of a fiber cable that houses the second optical fiber.

In another aspect, the connector is configured as one of a plug-type connector and a socket-type connector. In one aspect, the outer housing is configured to mate with a receptacle.

According to another aspect of the present invention, an optical fiber connector comprises an outer housing and a collar body disposed in the outer housing. The collar body includes a flexible wall portion, where the collar body receives and secures a ferrule in a first portion of the collar body, where the ferrule includes a central bore that defines an axis. The ferrule further includes a fiber stub disposed in a portion of the central bore, the fiber stub comprising a first optical fiber having a first end proximate to an end face of the ferrule and a prepared second end terminating within the ferrule. The collar body further includes a second portion that includes a housing portion to house a gripping device that grips a second optical fiber, where the first and second fibers are optically coupled upon connection of the optical fiber connector to one of a connector coupling, a connector adapter and a connector socket.

In another aspect, the flexible wall portion of the collar body comprises bowed outer side walls. In another aspect, the flexible wall portion of the collar body comprises a resilient material forming a portion of the side walls.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
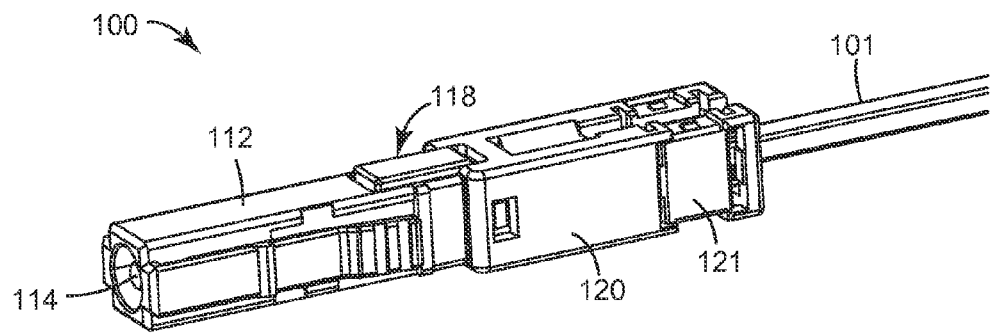
FIG. 1 is an isometric view of an exemplary optical connector according to an aspect of the present invention.
Figure 2:
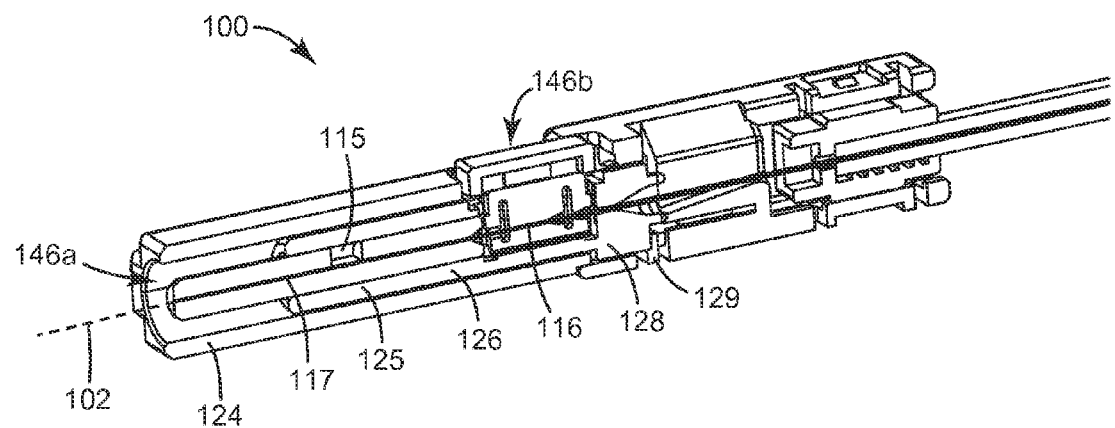
FIG. 2 is an isometric cut-out view of the exemplary optical connector of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an optical connector. In particular, the optical connector of the exemplary embodiments provides a fiber stub-type connector without the need for fusion splicing or index matching gel, as the stub fiber and field fiber are held in physical contact during optical connection of the connector. The connector structure includes a gripping device that provides a controlled contact force to a field fiber that is terminated to the fiber stub. This contact force can be maintained over a wide temperature variation. The exemplary connector can be field terminated without the need for extensive field polishing.

In particular, as shown in the embodiments below, an exemplary optical fiber connector comprises an outer housing configured to mate with a receptacle and a collar body disposed in the outer housing. The collar body receives and secures a ferrule in a first portion of the collar body, where the ferrule includes a central bore that defines an axis. A fiber stub is disposed in a portion of the central bore, with the first end being proximate to an end face of the ferrule and a prepared second end terminates within the ferrule. The collar body can house a gripping device that provides a contact force that is applied to a second optical fiber in the axial direction that contacts with the second end of the first fiber inside the central bore.

According to a first exemplary embodiment, an optical fiber connector 100 is shown in isometric view in FIG. 1. FIGS. 2-8 provide more detailed views of various components of optical connector 100.

As shown in FIG. 1, exemplary optical connector 100 includes a body 112, a ferrule 114 provided at the body 112, and an incorporated optical fiber (see fiber 117 in FIG. 2) of a predetermined length securely supported at the ferrule 114. The optical connector 100 also includes a gripping device 118 provided at the body 112 near the ferrule 114 that operates to securely support terminated field optical fiber 116 (see FIG. 2) from an optical fiber cable 101. A cable holding member 120 is provided at the body at an opposite side to the ferrule 114 from the gripping device 118 and is configured to hold optical fiber cable 101 via a clamping mechanism 121. In a preferred aspect, field fiber 116 is spliced to stub fiber 117 in the ferrule 114 of the connector 100 through a butt couple. No index matching gel is required at the joint/splice location, as appropriate contact force between the fibers is maintained through the structure of the gripping device, as is described in further detail below.

The body 112 can include a hollow inner cylinder or collar body 125 (see FIGS. 2 and 6) in which the ferrule 114 is secured (via an adhesive or interference fit) and a hollow outer housing 124 that accommodates the inner cylinder 125 slidably in an axial direction.

The collar body 125 and the outer housing 124 can both be formed integrally from a suitable plastic material, such as Vectra, by, for example injection molding, although metal and other suitably rigid materials can also be utilized. Collar body 125 can slide and can be forcibly held forward by action of a resilient element, such as a resilient element 129, which acts on rear collar body portion 128, in the body of connector. Alternatively, a spring element (not shown) can be utilized to provide forward force. In a preferred aspect, the outer housing 124 is configured to be received by a receptacle, for example, a FAS socket receptacle or a FA socket receptacle, both of which are available from 3M Company, St. Paul, Minn.). Alternatively, optical connector 100 can be configured to mate with a standard format receptacle, such as SC, ST, FC, and LC connector formats. As would be apparent to one of skill in the art given the present description, the optical connectors described herein can be employed in both plug-type connectors and socket-type connectors.

The collar body 125 can be formed of a stepped tubular shaped member having a center axis coincident with the fiber axis 102. An outer diameter front portion 126 and an outer diameter rear portion 128 are integrally formed adjoining each other in the axial direction. The front portion 126 is open at its front end in the axial direction and is formed with a first recess securely receiving the ferrule 114.

The outer housing 124 of the body 112 is provided with a first cavity opening 146a at the front end in the axial direction (left end in the figure). The first cavity 146a of the outer housing 124 receives the area of the front end 126 of the collar body 125 which holds the ferrule 114. An opening 146b is also provided to receive gripping device 118, which is disposed in a housing area of the collar body. The collar body 125 has an opening that receives the gripping device 118 which can include a gripping element 142 and a cap 144. The outer housing 124 has an opening that is aligned with the opening 146b in the collar body that allows access to the cap 144 to move from an unactuated position to an actuated position.

The gripping device 118 can float in the housing area. For example, a spring element (no shown) can be used to hold the element 142 in opening 146 such that the element rests on the bottom of the opening and against the back wall of the opening 146b. Also, the spring can allow for the element to expand and contract as temperature changes. The rear portion of the collar body can accommodate a coil spring (not shown) for end loading of the ferrule to appropriate load levels.

The ferrule 114 of the optical connector 100 is a generally tubular member formed with a precision bore or through-hole (also referred to as a fiber holding channel) along its center axis for holding fiber 117 and has a substantially cylindrical outer surface. The central bore or through-hole guides and aligns a field fiber (fiber 116) to make an optical connection with fiber 117. The ferrule 114 is provided with an abutting end face 162 at one end in the axial direction extending flat substantially perpendicular to the center axis. The central bore is generally centered on the end face 162 and extends straight along the center axis. In a preferred aspect, the ferrule end face 162 is tapered. Also, the central bore can have a tapered guide surface 164 at the opposite side from the end face 162 (see FIG. 3). The ferrule 114 can be fabricated from a ceramic, a glass, a plastic, or other conventional material.

The fiber holding channel of the ferrule 114 includes fiber 117 (also referred to as a fiber stub) having a predetermined length inserted in it and secured by an adhesive (not shown). In addition, the ferrule 114 can include a ferrule cut-out portion or slot 115 (positioned at a generally midpoint location) that provides a location to monitor the application of the adhesive. In other embodiments, the ferrule slot can also provide access to the fiber joint location and for cleaning the abutting ends of fibers 117 and 116.

Figure 3:
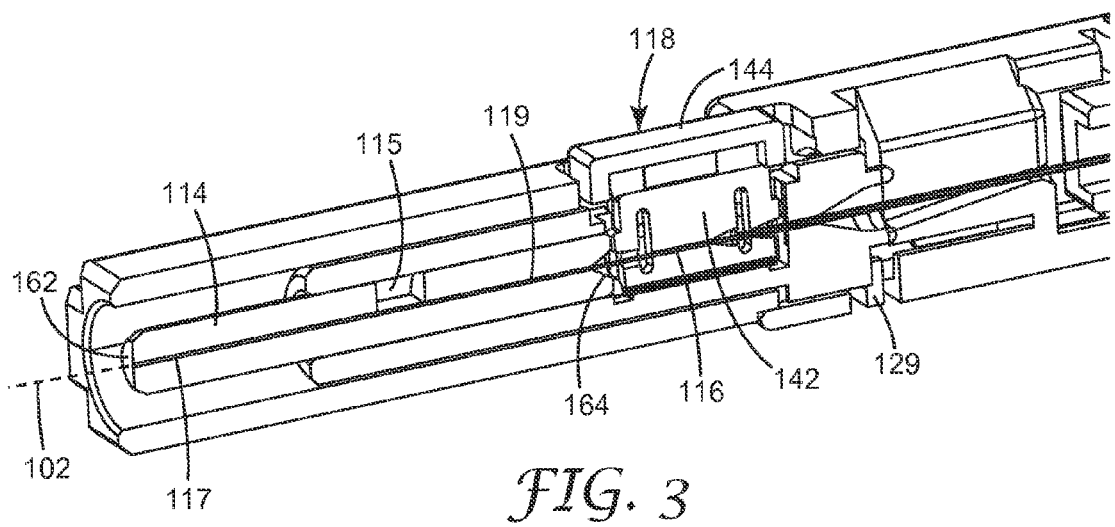
FIG. 3 is an isometric cut-out close-up view of several components of the exemplary optical connector of FIG. 1.

In a preferred aspect, the predetermined length of fiber 117 is less than the length of the ferrule (see e.g., FIG. 3). In this aspect, optical fiber 117 includes finished (e.g., polished) end faces, where the finishing process takes place at the factory. In one aspect, the second (rear) end of fiber 117 can be polished in the factory to reduce the sharpness of the edge of the fiber. For example, an electrical arc, such as one provided by a conventional fusion splicer machine, can be utilized to melt the tip of the fiber and form a rounded end, thereby removing the sharp edges. This electrical arc technique can be used in conjunction with polishing by an abrasive material to better control end face shape while reducing possible distortion of the core. An alternative non-contact method utilizes laser energy to ablate/melt the tip of the fiber.

Fiber 117 (and field fiber 116) can comprise a standard single mode or multimode optical fiber, such as SMF 28 (available from Corning Inc.). In an alternative embodiment, fiber 117 can additionally include a carbon coating disposed on the outer clad of the fiber to further protect the glass-based fiber.

In an exemplary aspect, fiber 117 can be secured in ferrule 114 as follows. An adhesive is injected into the central bore of the ferrule. Preferably, the adhesive is applied at the forward end of the slot 115 (the forward end is closer to the ferrule end face) so that adhesive will not flow into the rear portion of the ferrule (i.e., nearest the gripping device 118). In a preferred aspect, the slot 115 has a depth to a surface of the central bore that helps reduce the possibility of adhesive flowing toward the gripping device side of the ferrule. The adhesive, such as an epoxy, is preferably designed to withstand large temperature variations, such as the standard Telcordia 326 range of from about −40° C. to about 75° C., or a range from about −40° C. to about 85° C. A fiber 117 having first and second ends that are prepared (e.g., polished, radiused, beveled, prepared as described above or otherwise prepared in a conventional manner) is inserted in the ferrule central bore at the tapered end 164 and fed through until a portion of the fiber 117 protrudes beyond the ferrule end face 162. The fiber 117 can be further pulled from the front end until the back end of the fiber 117 is positioned within the central bore of the ferrule by a predetermined amount. The fiber is then bonded in the ferrule by the injected adhesive. The excess length of fiber protruding from the ferrule end face 162 is removed. The exposed fiber end face (located at about the ferrule end face) is then polished flush with the ferrule end face 162 using a conventional polishing technique. Thus, ferrule 114 can include a stub fiber having a polished end face at the ferrule end face and a prepared second end located within the ferrule at or about fiber joint location 119 (see FIG. 3).

In an alternative aspect (not shown) the abutting ends of the fibers 117 and 116 can contact one another within the area of slot 115. In that respect, visual inspection of the fiber joint may be made in a straightforward manner.

As mentioned above, the optical connector 100 also includes a gripping device. The preferred aspects describe a gripping device 118 that includes a gripping element and actuating cap. Alternatively, the gripping device can have a design similar to that of a conventional mechanical splice currently available in the industry, such as described in Japan Patent Kokai H9-318836. For example, in an alternative aspect, the gripping device can include a wedge-actuated mechanical gripping element. Other variations can be utilized as would be apparent to one of skill in the art given the present description.

In a preferred aspect, gripping device 118 of the optical connector 100 comprises a fiber securing or gripping element 142 disposed in a second recess of the collar body 125. The gripping element grips an optical fiber to be terminated in the field (here, field fiber 116). The gripping device 118 can also include an actuating cap to actuate the fiber gripping element 142. In a preferred aspect, the gripping element 142 comprises a sheet of ductile material having a focus hinge 142a that couples two legs 142b and 142c (see FIG. 4), where one or both of the legs can include a fiber gripping channel (e.g., a V-type (or similar) groove 147 (see FIG. 5)) to optimize clamping forces for a conventional glass optical fiber (fiber 116) received therein. The ductile material, for example, can be aluminum or anodized aluminum, or another malleable material. Gripping device 118 allows a field technician to remotely (from the ferrule) grip the optical fiber 116 being terminated with the fiber stub 117. Field fiber 116 is stripped of its outer jacket and buffer coating near the abutting end. In a preferred aspect, the abutting end of fiber 116 can also be cleaved (flat or angled, with or without bevels) using a field fiber cleaver and cleaving process.

Figure 4:
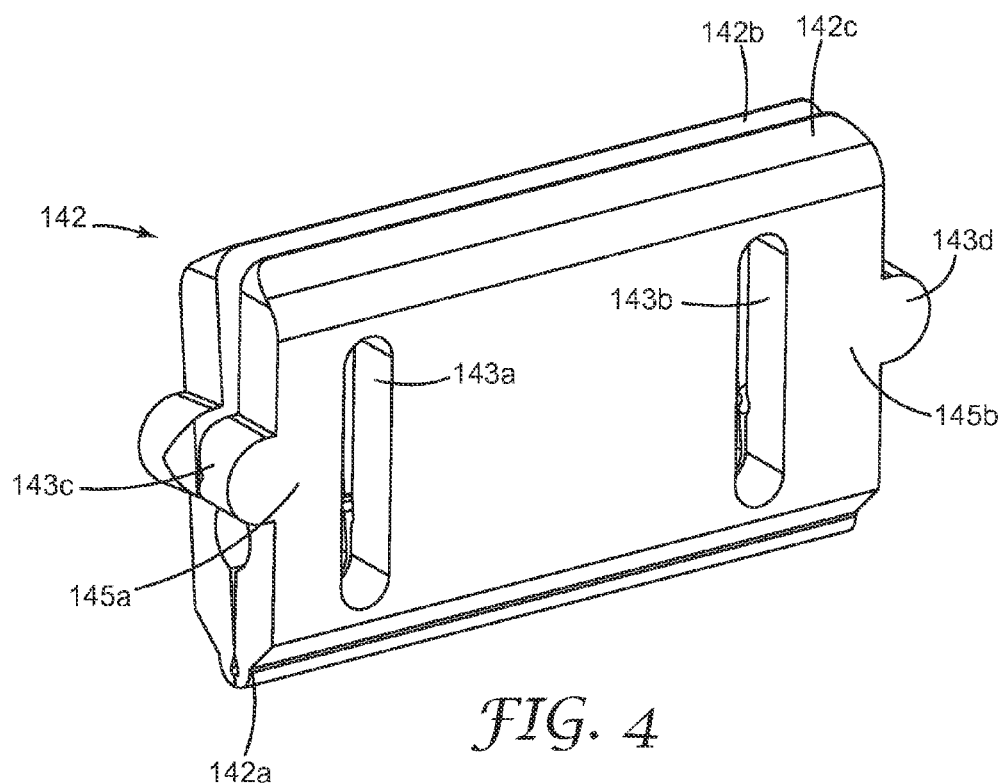
FIG. 4 is an isometric close-up view of a gripping element according to an aspect of the present invention.
Figure 5:
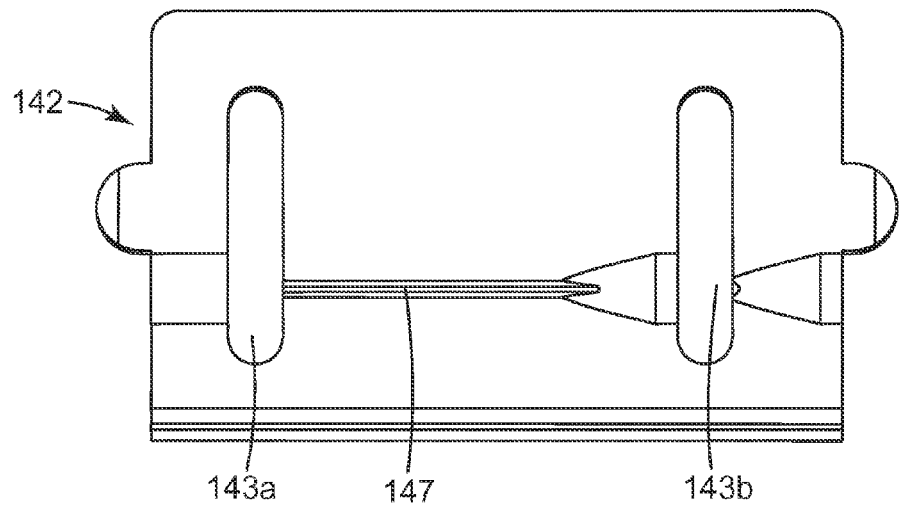
FIG. 5 is a side view of the gripping element of FIG. 4.
Figure 6:
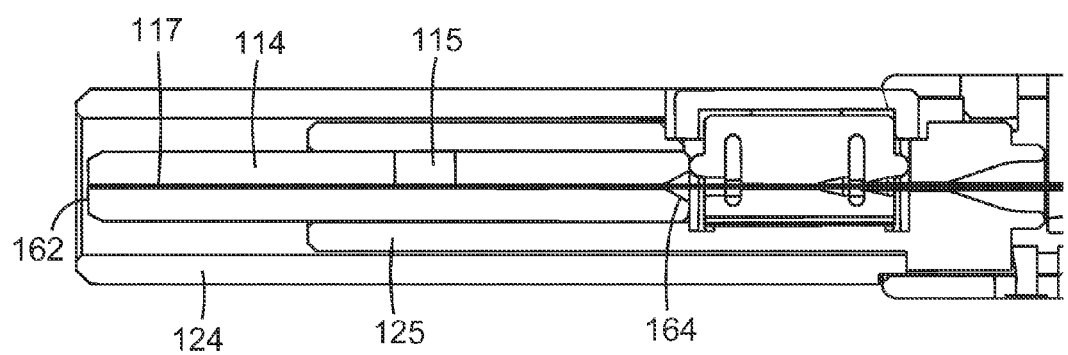
FIG. 6 is a side view of several components of the exemplary optical connector of FIG. 1.

In addition, the gripping element 142 includes two openings or slots formed in each of the element legs oriented transverse to the direction of the fiber axis. For example, as shown in FIG. 4, slots 143a and 143b are formed in leg 142c. Slots of similar configuration are also formed in leg 142b. These slots are preferably positioned at different longitudinal locations relative to the front and rear ends of the element 142. In this manner, the slots can generate different spring forces that are applied by the element 142 in the axial direction. For example, as shown in FIG. 4, a first spring beam 145a is provided at the front portion of the element 142 (i.e., closest to the ferrule) and a second spring beam 145b is provided at the rear portion of the element 142. In one aspect, spring beam 145a has a weaker spring constant than spring beam 145b. The slots 143a, 143b are preferably formed so that the slots may cut across the fiber guiding groove 147 (see FIG. 5).

The gripping element 142 can also include projections located on longitudinal end portions of the legs. For example, FIG. 4 shows projections 143c and 143d formed on element leg 142c. In a preferred aspect, projection 143c can contact a rear portion of ferrule 114 and projection 143d can contact a portion of actuating cap 144. This flexible gripping element structure can distribute an appropriate axial force so that sufficient contact between fiber 116 and stub fiber 117 is maintained.

In an exemplary embodiment, the gripping device 118 is mountable in the collar body 125 such that it is substantially secured within a fixed element cradle or nest formed within portion the collar body 124. Actuating cap 144 is configured to engage the gripping element 142 such that the element 142 grips the fiber 116 inserted therein. The cap 144 can be formed or molded from a polymer material, although metal and other suitable materials can also be utilized. In one aspect, the cap 144 can be formed from a material being the same as the material forming the element 142. Alternatively, a material having at least a similar coefficient of thermal expansion (CTE) as the element can be utilized.

Figure 7:
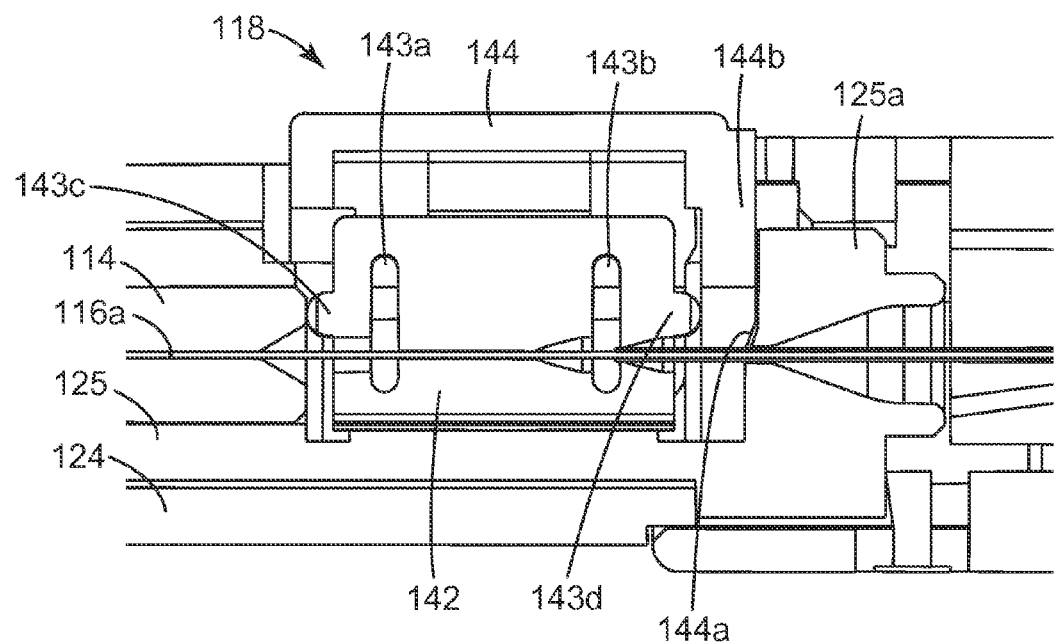
FIG. 7 is a close-up side view of the gripping element of an aspect of the present invention prior to actuation.
Figure 8:
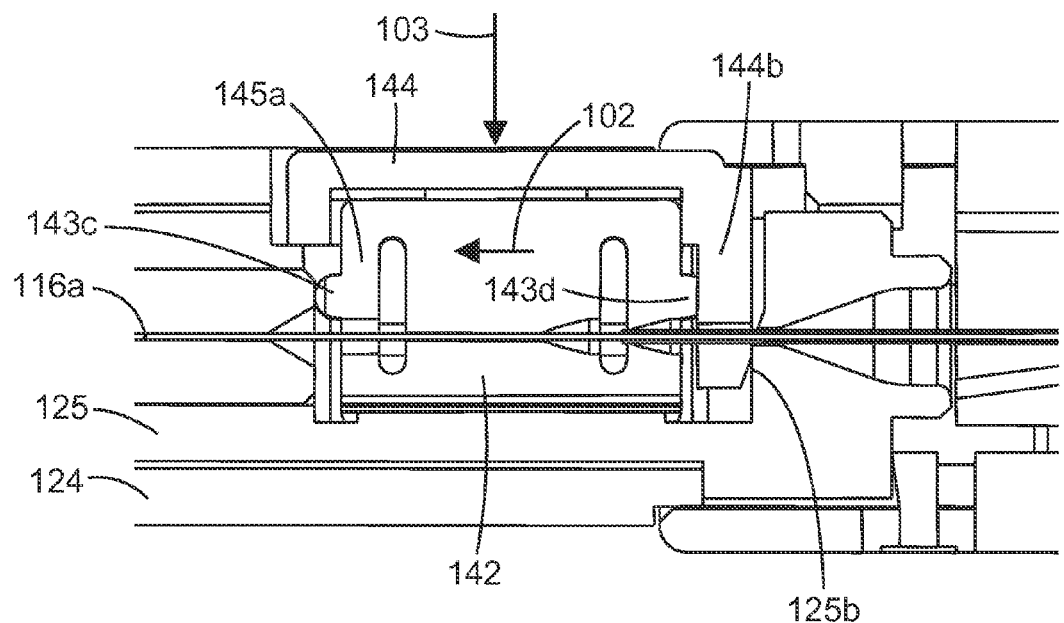
FIG. 8 is a close-up side view of the gripping element of an aspect of the present invention after actuation.
Figure 9:
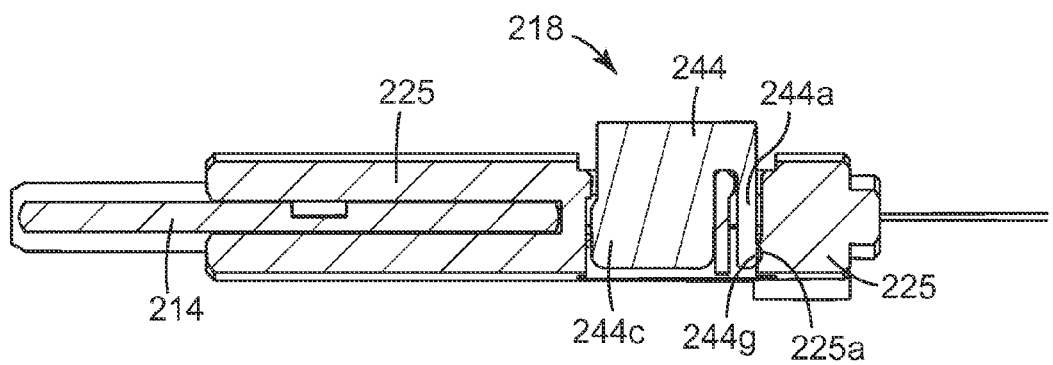
FIG. 9 is a side view of another exemplary optical connector according to an alternative aspect of the present invention.
Figure 10:
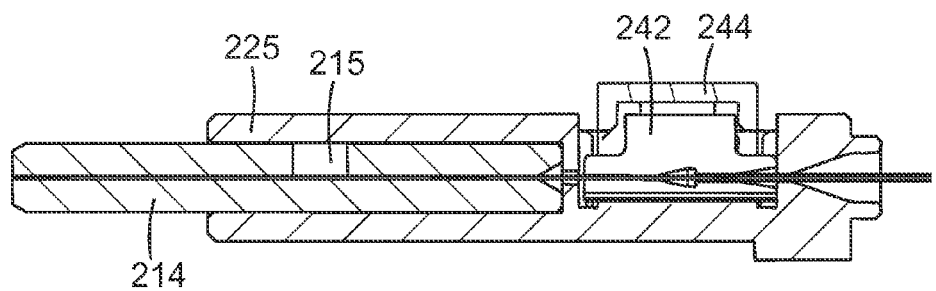
FIG. 10 is a side view of another exemplary optical connector according to an alternative aspect of the present invention.
Figure 11:
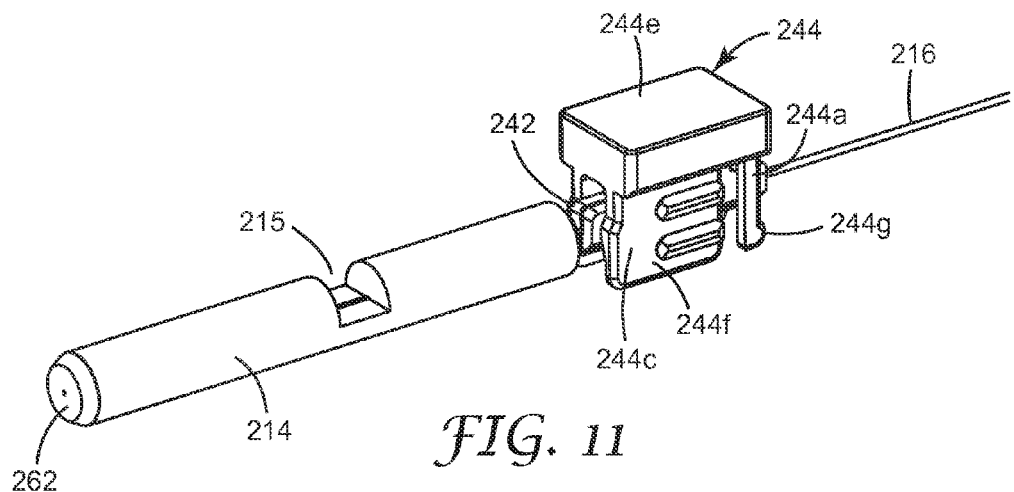
FIG. 11 is an isometric view of several components of an optical connector according to an alternative aspect of the present invention.

FIG. 7 shows a schematic side view of exemplary gripping device 118 before actuation of the element 142 that grips field fiber 116. FIG. 8 shows a schematic side view of the gripping device 118 after actuation of the element 142 by cap 144. In this exemplary aspect, the actuation procedure also axially moves element 142 (and the fiber gripped therein) towards the ferrule to provide an appropriate contact force for fiber 116 to optically couple to stub fiber 117.

In operation, as the cap 144 is moved from an open position (FIG. 7) to a closed position (downward in the direction of arrow 103 in FIG. 8), one or more cam bars located on an interior portion of the cap 144 can slide over the element legs 142b and 142c, urging them toward one another. The glass portion of the fiber 116, placed in the groove 147 formed in the element 142, is gripped as the element legs are moved toward one another by the cap 144. Also, a cam portion 144a formed on cap leg 144b contacts the rear portion 125a of collar body 125 and another portion of leg 144b contacts protrusion 143d of the element. As the cap 144 is further moved downward, cam 144a engages surface 125b of the collar body 125. Some resistance to forward motion is provided by the forward spring beam, as protrusion 143c contacts a portion of ferrule 114. As the (rear) spring beam 145b provides a stronger spring force than the spring force of (forward) spring beam 145a, the element 142 is urged in the direction of arrow 102 (towards the ferrule 114) under a controlled force. For example, a net spring force of about 0.1 lbs. to about 0.4 lbs. can provide a suitable pre-load for the fiber joint. As shown in FIG. 8, the abutting end 116a of fiber 116 is translated within the ferrule 114 towards stub fiber 117. The force creates and maintains good optical contact between the fibers in the ferrule 114. In addition, at higher temperatures, ferrule 114 can expand and act against the projection 143c, as this force would be absorbed by spring beam 145a. Also, the collar body can act against projection 143d, but this force would be absorbed by spring beam 145b, with the net force kept within the preferred range of about 0.1 lbs. to about 0.4 lbs. At lower temperatures, the ferrule may contract, but spring beams 145a and 145b can compensate for the created gap.

Referring back to FIG. 1, connector 100 further includes a cable holding member 120. The rear portion of the cable holding member can include a receptive groove for receiving the optical fiber cable 101. In a preferred aspect, the optical fiber cable can include a conventional 250 µm disposed in a center portion of an outer jacket, which has a rectangular shape in this exemplary aspect. The cable holding member can secure the optical fiber cable 101 to prevent axial strain on the fiber 116 being joined to the stub fiber 117 in the ferrule. The structure of the cable holding member 120 and the clamping mechanism 121 are described in more detail below with respect to the embodiment shown in FIG. 15.

An alternative aspect of the present invention is shown in FIGS. 9-15, where a connector 200 includes a gripping device 218 that has an alternative construction (as compared to gripping device 118 described above). Exemplary optical connector 200 includes a body 212, a ferrule 214 provided at the body 212, and a fiber stub 217 of a predetermined length securely supported at the ferrule 214. The optical connector 200 also includes gripping device 218 to securely support terminated field optical fiber 216 (see FIG. 15) from an optical fiber cable 201. A cable holding member 220 is provided at the body at an opposite side to the ferrule 214 from the gripping device 218 and is configured to hold optical fiber cable 201 via a clamping mechanism 221. In a preferred aspect, field fiber 216 is spliced to stub fiber 217 in the ferrule 214 of the connector 200 through a butt couple at joint location 219. No index matching gel is required at the joint/splice location, as appropriate contact force between the fibers is maintained through the structure of the gripping device.

Figure 12:
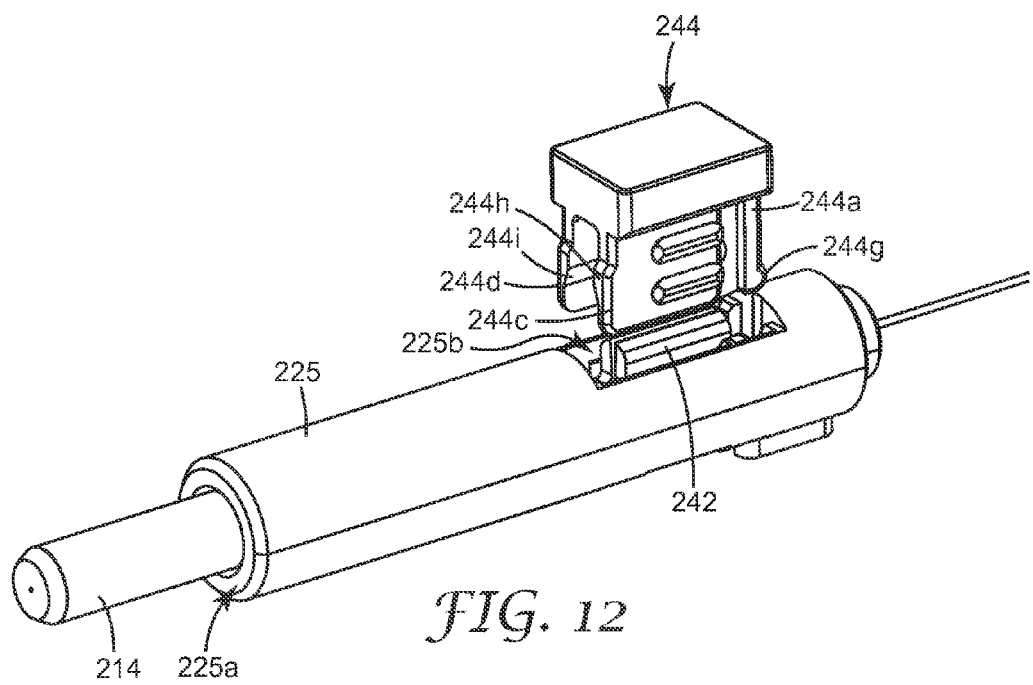
FIG. 12 is an isometric view of several components of an optical connector according to an alternative aspect of the present invention.
Figure 13:
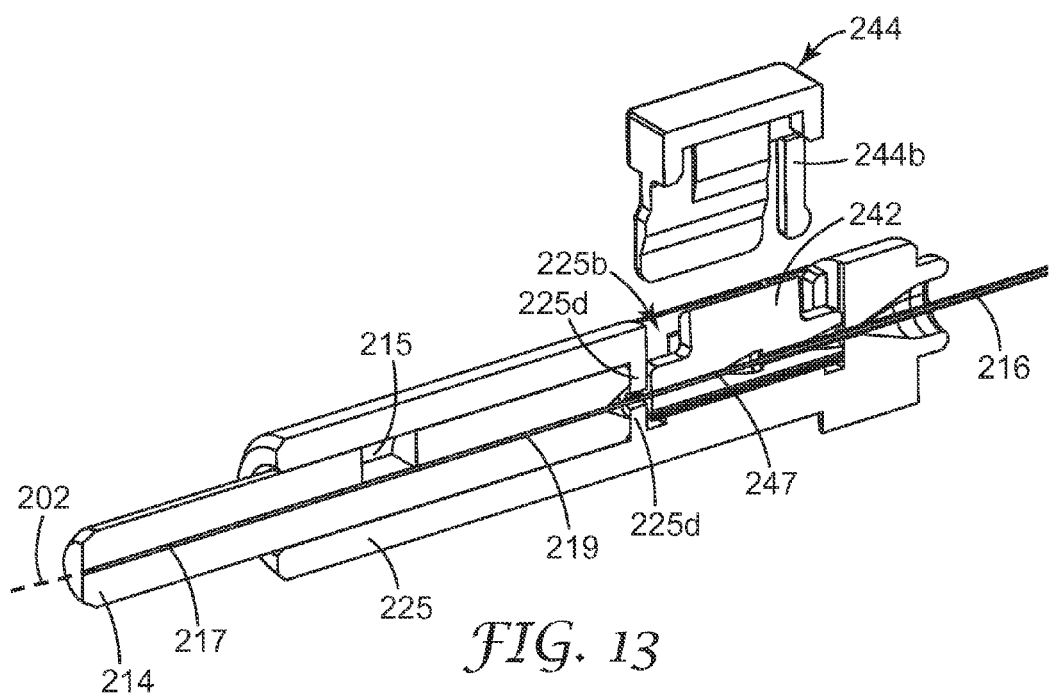
FIG. 13 is an isometric cut-out view of several components of an optical connector according to an alternative aspect of the present invention.
Figure 14:
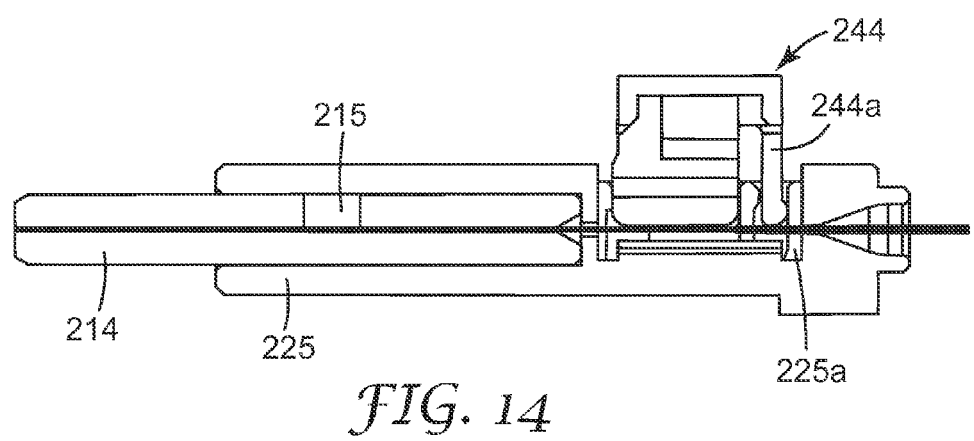
FIG. 14 is a side view of several components of an optical connector according to an alternative aspect of the present invention.

The body 212 can include a hollow inner cylinder or collar body 225 (see FIGS. 12-14). The ferrule 214 may be secured in a front portion of the collar body by an adhesive or interference fit. A hollow outer housing 224 receives the collar body 225 slidably in an axial direction. The collar body 225 and the outer housing 224 can both be formed integrally from a suitable plastic material by, for example injection molding, although metal and other suitably rigid materials can also be utilized. In a preferred aspect, the outer housing 224 is configured to be received by a mating receptacle, for example, a FAS socket receptacle or a FA socket receptacle, both of which are available from 3M Company, St. Paul, Minn.). Alternatively, optical connector 200 can be configured to mate with a standard format receptacle, such as SC, ST, FC, and LC connector formats.

The collar body 225 can include a stepped, tubular shaped member having a center axis coincident with the fiber axis 202. The front portion 226 of the collar body 225 is open at its front end in the axial direction and is formed with a first recess 225a that securely receives the ferrule 214.

The outer housing 224 of the body 212 is provided with a first cavity opening at the front end in the axial direction (left end in the figure). The first cavity of the outer housing receives the area of the front end 226 of the collar body 225. An opening 246b is also provided to receive gripping device 218 in a housing area formed in the collar body (see area 225b shown in FIG. 12).

The ferrule 214 of the optical connector 200 is a generally tubular member formed with a precision bore or through-hole along its center axis for holding fiber 217 and has a substantially cylindrical outer surface. The bore or through-hole guides and aligns a field fiber (fiber 216) to make an optical connection with stub fiber 217. The ferrule 214 is provided with an abutting end face 262 at one end in the axial direction extending flat substantially perpendicular to the center axis and the precision bore has an opening at the center of the end face 262 and extends straight along the center axis. In a preferred aspect, the ferrule end face 262 is angled or tapered. The ferrule 214 can be fabricated from a ceramic, a glass, a plastic, or other conventional material.

In addition, the ferrule 214 can include a ferrule slot 215 that provides a location to monitor the application of an adhesive in the ferrule to secure the fiber stub. The stub fiber 217 has a predetermined length and is secured by an adhesive (not shown) in the central bore or through-hole. Optical fiber 217 includes finished (e.g., polished) end faces, where the finishing process takes place at the factory, as is described above with respect to connector 200. Fibers 217 and 216 can comprise a standard single mode or multimode optical fiber, such as SMF 28 (available from Corning Inc.). Fiber 217 can be secured in ferrule 214 in a manner the same as or similar to that described above with respect to connector 100. Thus, ferrule 214 can include a stub fiber having a polished end face at the ferrule end face and a prepared second end located within the ferrule 214 at or about joint location 219 (see FIG. 13). In a preferred aspect, the abutting end of fiber 216 can be cleaved (flat or angled, with or without bevels) using a field fiber cleaver and cleaving process.

In a preferred aspect, the gripping device 218 of the optical connector 200 comprises a fiber securing or gripping element 242 disposed in a housing area 225b of the collar body. Element 242 grips an optical fiber 216 that is to be terminated to the stub fiber 217. The gripping device 218 also includes an actuating cap 244 to actuate the fiber gripping element 242. In a preferred aspect, the gripping element 242 comprises a sheet of ductile material having a focus hinge that couples two legs, where each of the legs includes a fiber gripping channel (e.g., a V-type (or similar) groove 247 (see FIG. 13)) to optimize clamping forces for a conventional glass optical fiber (fiber 216) received therein. The ductile material, for example, can be aluminum or anodized aluminum, or another malleable material. In this exemplary aspect, element 242 does not include slots to generate different axial spring forces. It is noted that the element 242 of this exemplary embodiment is not required to include slots formed therein to generate different spring beams.

Actuating cap 244 is configured to engage the gripping element 242 such that the element 242 grips the fiber 216 inserted therein. The cap 244 can be formed or molded from a polymer material, although metal and other suitable materials can also be utilized. In particular, actuating cap 244 includes a cover portion 244e (contacted by a technician or actuating device during actuation) and a main body portion 244f. The main body portion 244f includes two main legs 244c and 244d and two spring legs 244a and 244b. The main legs 244c and 244d include cams disposed on inner surfaces to engage and clamp the legs of element 242 when the cap is pressed onto the element 242. Further, the main legs 244c and 244d can each include a forward shoulder portion (e.g., shoulder portions 244h and 244i shown in FIG. 12) designed to engage with a retaining wall portion 225d of the collar body 225 disposed between the gripping element and the ferrule 214.

The spring legs 244a and 244b are configured to engage with a cam surface 225a of the rear portion of the collar body 225. During this engagement, the spring force generated by the contact of legs 244a and 244b will urge the cap/element forward, and the field fiber 216 gripped therein, towards the ferrule. The structure of spring legs 244a and 244b (providing a forward axial force) and the shoulder portions 244h and 244i of the main legs (providing a rearward axial force) can provide a controlled total contact force so that sufficient contact between fiber 216 and stub fiber 217 is maintained in ferrule 214 after termination. For example, a pre-load force of about 0.1 lbs. to about 0.4 lbs. can provide a suitable pre-load for fiber 216 at the fiber joint.

Also, the above connector design can address temperature fluctuations through the above-mentioned spring leg action. The spring provides the desired force throughout the temperature range. For example, at high temperatures, the collar body and cap (or gripping device 218) can expand, but spring leg(s) 244a, 244b can engage with cam surface 225a at the rear portion of the collar body. Here, the spring legs 244a, 244b can maintain adequate spring force on the element to ensure good fiber to fiber contact despite a CTE mismatch between collar and cap materials. Similarly, at low temperatures when the collar and cap contract, the spring force can compensate for a created gap.

Figure 15:
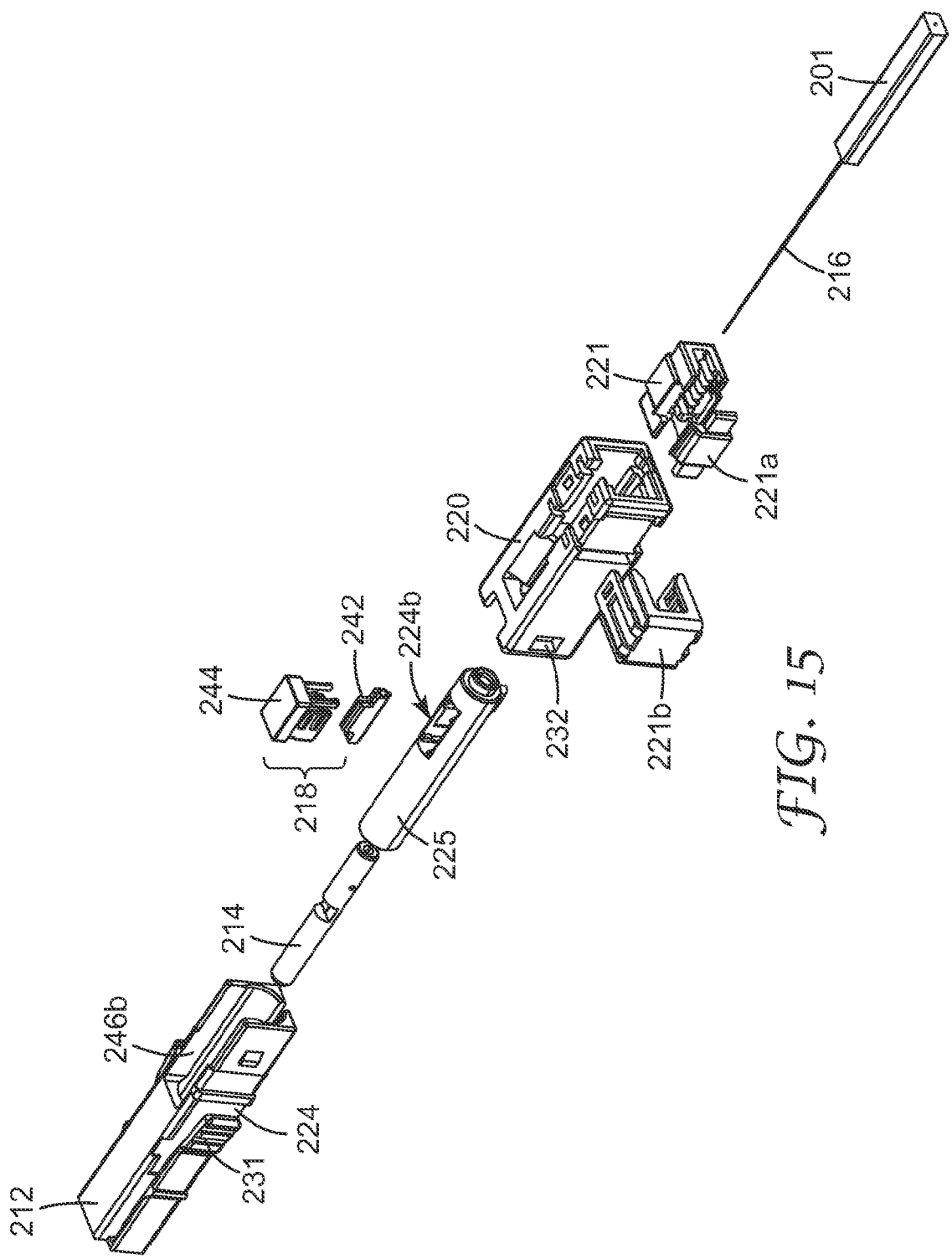
FIG. 15 is an exploded view of an optical connector according to an alternative aspect of the present invention.
Figure 16:
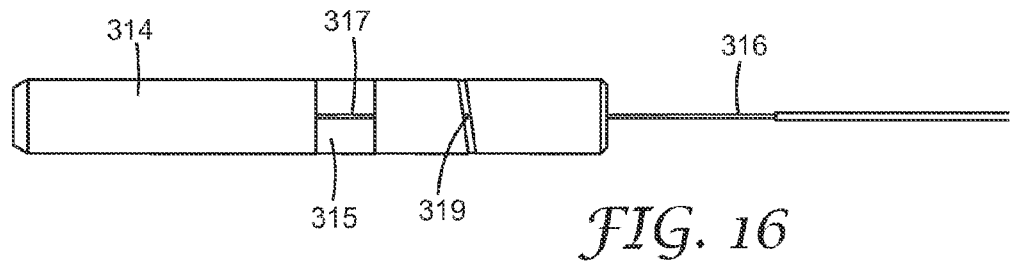
FIG. 16 is a top view of an exemplary ferrule according to another alternative aspect of the present invention.
Figure 17:
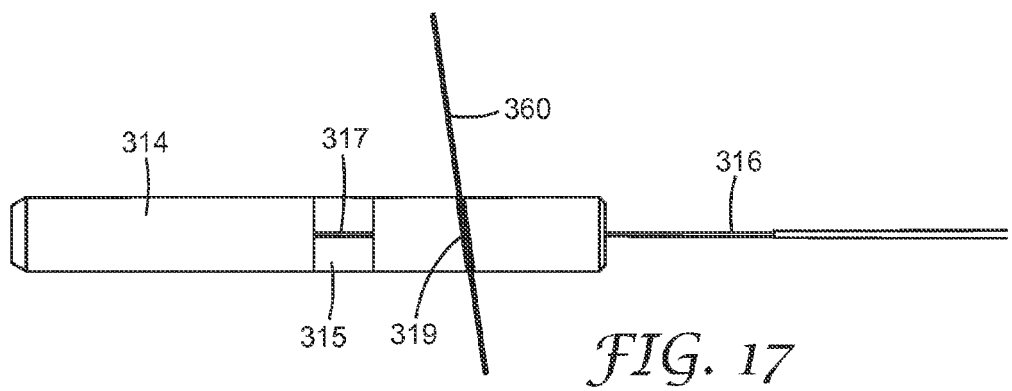
FIG. 17 is a top view of an exemplary ferrule according to another alternative aspect of the present invention.
Figure 18:
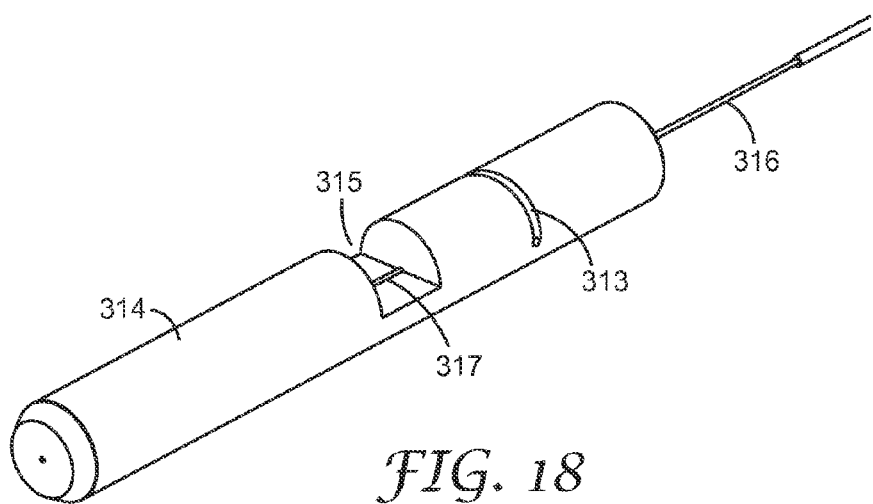
FIG. 18 is an isometric view of an exemplary ferrule according to another alternative aspect of the present invention.
Figure 19:
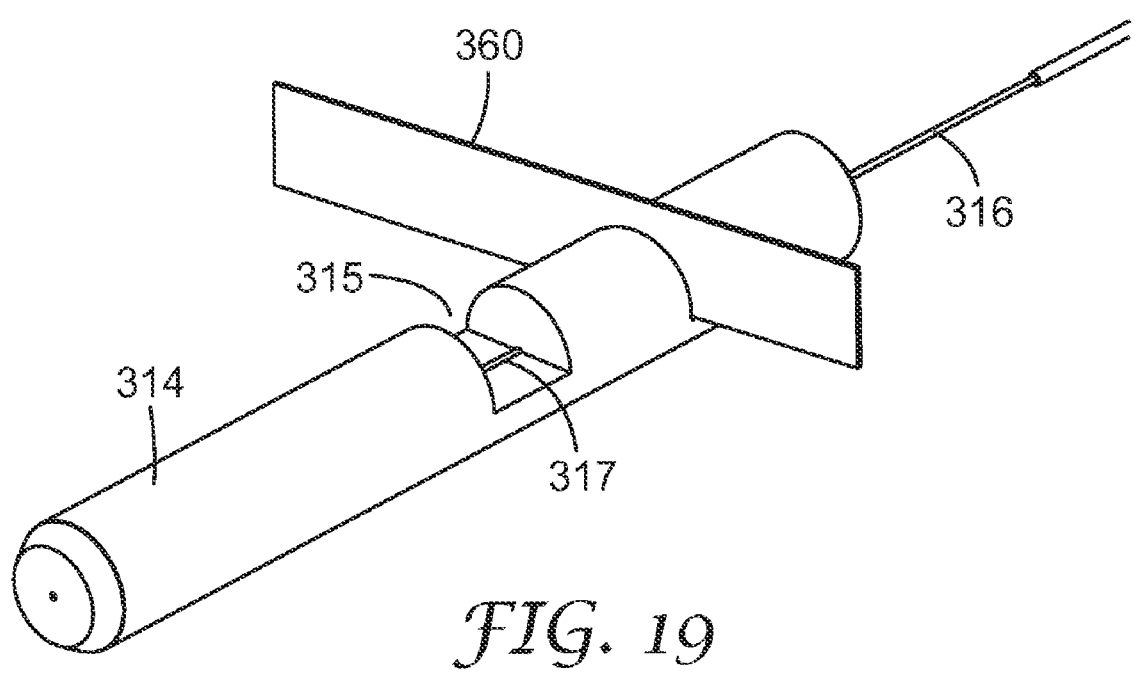
FIG. 19 is an isometric view of an exemplary ferrule according to another alternative aspect of the present invention.

Referring to FIG. 15, connector 200 further includes a cable holding member 220 that includes a cable clamping mechanism 221 having a main body, a lid 221a and a retention clip 221b. The clip 221b is configured to engage a portion of the main body of the cable holding member 220 and secures the clamping mechanism 221 therein, whereas lid 221a can trap the cable into mechanism 221 and slidably move into cable holding member 220 before engagement by clip 221b. Clamping mechanism 221 includes a receptive groove formed therein having engaging projections (such as rib structures or teeth) formed on one or more inner walls that are configured to securely retain the outer portion of cable 201. In one exemplary aspect, the projections have a saw-tooth shape in cross-section and are arranged so as to bite into the sheath of the optical fiber cable 201 received in the receptive groove at their top areas and statically hold the optical fiber cable in the receptive groove. In particular, by forming the plurality of engaging projections in saw-tooth shapes having the above orientations, the cable holding member 220 can strongly prevent the optical fiber cable received in the receptive groove from being easily pulled out of the connector.

In a preferred aspect, the central axis of the cable holding member 220 coincides with the fiber axis. The main body of member 220 can be configured to slidably engage the outer body portion 224 of body 212. Overall retention can be achieved by a latch mechanism, such as by latch 231 of body 212 engaging with notch or opening 232 of the cable holding member body. The cable holding member 220 can be formed integrally from a suitable plastic material by for example injection molding, or from a suitably rigid material.

In an exemplary aspect, a field termination process is provided as follows. A field fiber (e.g., fiber 116, 216) can be inserted into the cable clamp assembly (e.g., 120, 220). The fiber end can be prepared by e.g., cutting, stripping, and cleaving (flat or angled). The prepared fiber end is then inserted into the collar body/housing, through an unactuated gripping device, until the terminal end of the field fiber butts against the second end of the fiber stub (e.g., 117, 217), during which a fiber bow may be created. The actuating cap (e.g., 144, 244) of the gripping element can be pressed down onto the gripping element (e.g., 142, 242) to actuate the gripping of the field fiber and the proper load can be applied to the field fiber for sufficient contact to the fiber stub. After actuation, the fiber bow may be released and the cable may be held in place by the cable clamp assembly 220.

In an alternative embodiment, a collar body having an alternative structure can be utilized. For example, the collar body can be designed with one or more flexible outer walls that will bow outwards when the ferrule is subjected to a compression force. This structure can provide for additional contact force between the fiber stub and the field fiber. Also, this structure can be utilized to provide a safety interlock to optically decouple the fiber joint when the connector is not in use. This alternative embodiment is described in further detail below.

In a further alternative embodiment, the exemplary fiber connectors described herein can include an alternative ferrule structure. For example, FIGS. 16-19 show various views of a ferrule 314 that includes an access slot 313 for polishing/cleaning the abutting fiber ends of fibers 317 and 316. The access slot 313 can be made with a saw cut and can be oriented generally transverse to the central bore of the ferrule 314. For example, the slot 313 may be oriented at a small angle (e.g., about 5°-10° from normal to the fiber axis) for cleaning/polishing angle-cleaved/polished fibers. This small angle can be utilized to optimize reflection performance. In a preferred aspect, the slot 313 passes completely through the fiber pathway and can have a width from about 0.005" to about 0.060". The ferrule 314 can be fabricated from a ceramic, a glass, a plastic, or other conventional material. In a preferred aspect, fiber slot 313 is positioned at the location of the fiber joint 319, where fibers 317 and 316 are butt coupled. Fibers 317 and 316 can be constructed the same as or similar to the fibers described above.

In particular, fiber stub 317 can be installed in a manner similar to fiber 117 described above. A polishing or cleaning material 360 in strip form can be placed in slot 313 prior to insertion of the field fiber 316, whose abutting end can be cleaved (flat or angled, with or without bevels) using a field fiber cleaver and cleaving process. The field fiber can then be inserted such that the polishing or cleaning material 360 is disposed between the abutting ends of fibers 317 and 316. The polishing or cleaning material 360 can remove debris that may be picked up by the abutting ends during the installation process. In particular, the abutting fiber ends can be cleaned by pulling a tab portion of the polishing or cleaning material 360 to remove the strip. As the strip is removed, it contacts both abutting fiber end faces. The gripping device can be actuated prior to or after the polishing process. In a preferred aspect, the polishing or cleaning material 360 can comprise a polishing ribbon tape, and/or other cleaning materials such as nonwoven materials, lint free materials, abrasives, adhesives, alcohol or HFE wipes disposed on either or both of the strip faces.

Figure 20:
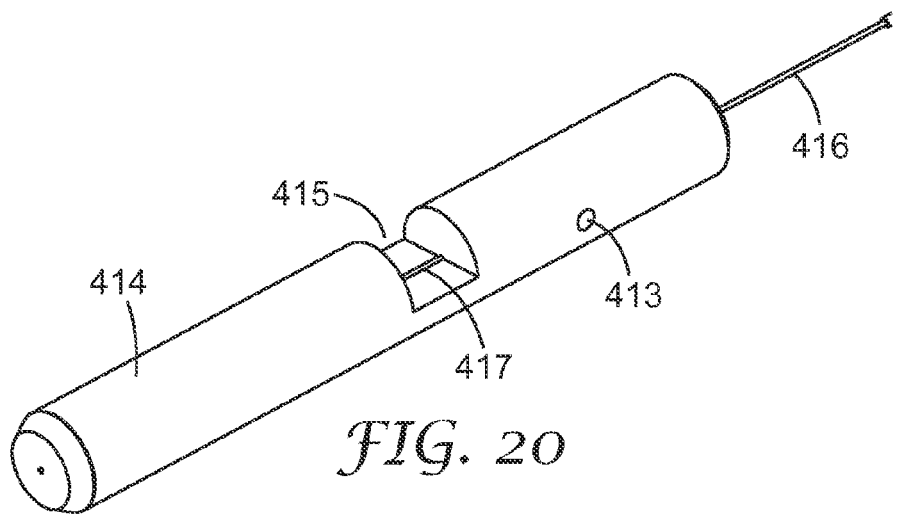
FIG. 20 is an isometric view of another exemplary ferrule according to another alternative aspect of the present invention.
Figure 21:
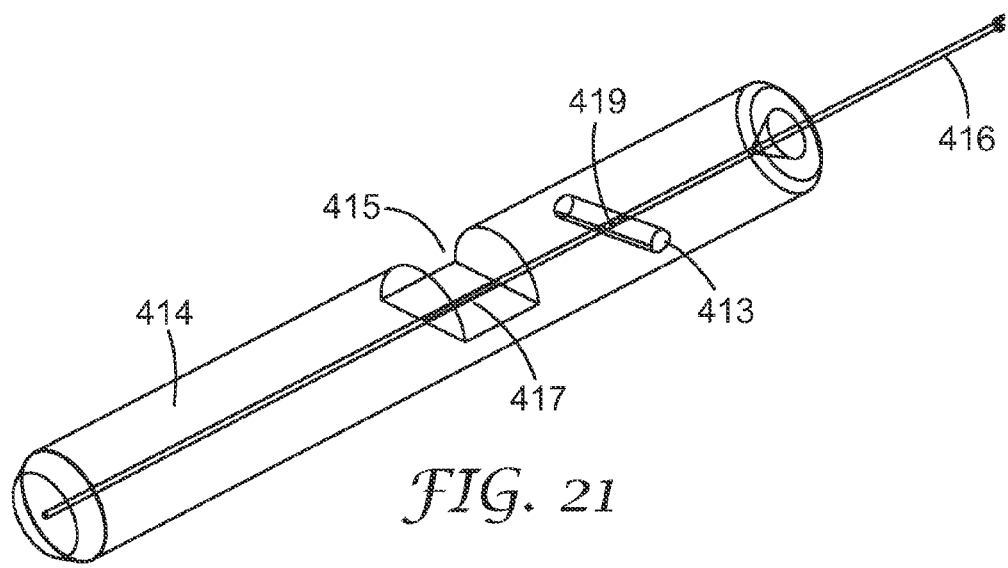
FIG. 21 is an isometric view of another exemplary ferrule according to another alternative aspect of the present invention.
Figure 22:
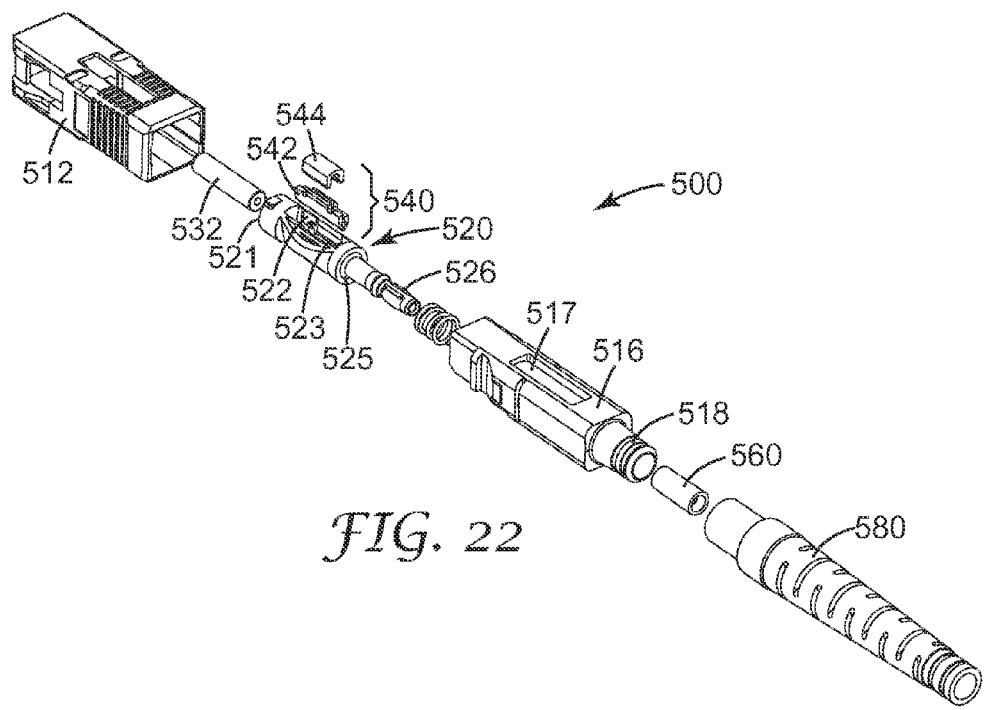
FIG. 22 is an exploded view of another exemplary optical connector according to another alternative aspect of the present invention.

In a further alternative embodiment, an alternative ferrule 414 is shown in FIGS. 20 and 21. Ferrule 414 can be constructed similar to ferrule 314, except that access to the fiber joint area 419 is provided by a through-hole 413 disposed generally transverse to the central bore of the ferrule. The polishing or cleaning material used in conjunction with this aspect can be shaped in a string or floss-like form, such as a polyimide thread (e.g., Kevlar), that can be inserted and removed through the through-hole 413.

As mentioned above, an alternative structure can be utilized to provide a safety interlock such that the fiber joint between the stub fiber and the field fiber is optically decoupled when the connector is not in use. In this alternative aspect, an exemplary optical fiber connector 500 is shown in FIGS. 22-25. Optical connector 500 is configured to mate with a receptacle. For example the exemplary optical connector 500 can be configured as having an SC, ST, FC, or LC connector format.

Optical fiber connector 500 can include a connector body having a housing shell 512 that is configured to be received in a receptacle (e.g., an SC coupling, an SC adapter, or an SC socket), and a backbone 516 that is housed inside the shell 512 and that provides structural support for the connector 500. In addition, backbone 516 further includes at least one access opening 517, which can provide access to actuate a gripping device disposed within the connector. Backbone 516 can further include a mounting structure 518 that provides for coupling to a fiber boot 580, which can be utilized to protect the field fiber from bend related stress losses. According to an exemplary embodiment of the present invention, shell 512 and backbone 516 can be formed or molded from a polymer material, although metal and other suitably rigid materials can also be utilized. Shell 512 is preferably secured to an outer surface of backbone 516 via snap fit.

Connector 500 further includes a collar body 520 that is disposed within the connector housing and retained therein. The collar body 520 is a multi-purpose element that can house a gripping device 540 and a fiber buffer clamp. The collar body also includes a flexible wall structure, such as bowed outer or side walls 527. The bowed side walls 527 are flexible and can provide axial movement to the ferrule 532, which is firmly seated against the internal flange 521a of the collar body. In an alternative aspect, the outer walls of the collar body can include a portion thereof having a compliant material to provide flexibility.

The collar body can be configured to have some limited axial movement within backbone 516. For example, the collar body 520 can include a shoulder 525 that can be used as a flange to provide resistance against a spring 555, interposed between the collar body and the backbone, when the ferrule 532 is inserted in, e.g., a receptacle. According to an exemplary embodiment of the present invention, collar body 520 can be formed or molded from a polymer material, although metal and other suitable materials can also be utilized. For example, collar body 520 can comprise an injection-molded, integral material. The choice of suitable materials for the collar body can be made in accordance with temperature stability parameters, as discussed in pending application (Attorney Docket No. 62902US002), incorporated by reference discussed herein.

Structurally, collar body 520 includes a first end portion 521 having an opening to receive and house a ferrule 532. Ferrule 532 can be formed from a ceramic, glass, plastic, or metal material to support the optical fiber being inserted and terminated. In a first exemplary aspect, ferrule 532 is a ceramic ferrule. Ferrule 532 can include a stub fiber 504 (similar to stub fibers 117 and 217 described above). In addition, ferrule 532 can include a first ferrule slot (similar to slots 115 and 215 described above) to apply and monitor a bonding adhesive and/or a second ferrule slot (configured in a similar manner to slot 313 described above or through-hole 413). The stub fiber and the field fiber can comprise a standard single mode or multimode optical fiber, such as SMF 28 (available from Corning Inc.). Ferrule 532 is preferably disposed flush with flange portion 521a and secured within the collar body portion via an epoxy or other suitable adhesive. Alternatively, ferrule 532 may be friction fit in the first end portion 521 of the collar body 520, such as being fitted and secured against flange portion 521a.

Collar body 520 further includes a housing portion 523 that provides an opening 522 in which the gripping device 540 can be inserted in the central cavity of collar body 520. In an exemplary aspect, the gripping device 540 can include an element 542 and an actuating cap 544. Gripping element 542 is mountable in the housing portion 523 of collar body 520 such that it is substantially secured within a fixed element cradle or nest 543 formed within the housing portion. When the element 542 is placed in the cradle or nest 543, a portion of the element is registered against a rear wall 523a of the housing portion 523. The other end of element 542 is disposed against elastic element 529, such as a spring arm. The axial force provided by spring arm 529 can be selected based on the intended force distribution within the connector over the expected temperature range of operation.

In a preferred aspect, the gripping element 542 comprises a sheet of ductile material having a focus hinge that couples two legs, where one or both of the legs includes a fiber gripping channel (e.g., a V-type, channel type or U-type groove 547 or a mixture of groove shapes) to optimize clamping forces for a conventional glass optical fiber received therein. In one exemplary embodiment, the element typically has one V-groove in one leg and a channel groove in the second leg to yield a three line contact region. The ductile material, for example, can be aluminum or anodized aluminum. Gripping device 540 allows a field technician to grip the optical fiber being terminated remotely from the ferrule. Alternatively, gripping device 540 can include a wedge-actuated mechanical gripping element.

Cap 544 can be configured to engage the gripping element 542 such that the element 542 grips the field fiber inserted therein. The cap can be formed or molded from a polymer material, although metal and other suitable materials can also be utilized. In a preferred aspect, the cap 544 can be formed from a material being the same as the material forming the element 542. Alternatively, a material having at least a similar coefficient of thermal expansion (CTE) as the element can be utilized. Also, the cap's size is designed to freely fit within housing portion 523 such that when it has fully engaged the element, the cap is not restricted from axial expansion/contraction with the element 542 during thermal expansion or contraction.

Connector 500 also includes a buffer clamping portion 526 of the collar body that can be configured to clamp the buffer portion of the optical fiber cable 515. In one aspect, buffer clamping portion 526 can be configured to include a buffer clamp as an integral part of its structure. According to an exemplary aspect, buffer clamping portion 526 can be configured to clamp a standard optical fiber buffer cladding. To activate the particular buffer clamping element, connector 500 can further include an actuation sleeve 560 having an opening extending therethrough that is axially slidably received by the outer surface of buffer clamping portion 526. Moreover, to prevent sharp fiber bends at the connector/fiber interface, a boot 580 can be utilized.

Figure 23:
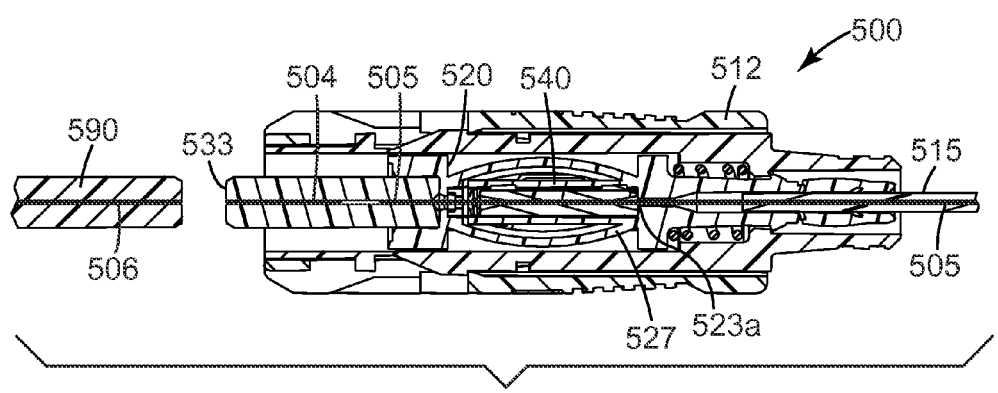
FIGS. 23-25 show schematic top views of another exemplary optical connector during connection according to another alternative aspect of the present invention.
Figure 24:
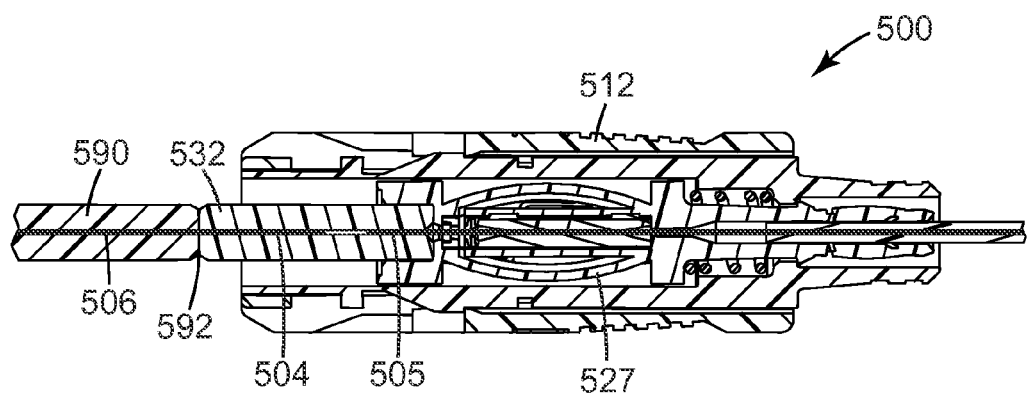

During connection, the structure of connector 500 can provide a safety interlock such that the fiber joint between the stub fiber and the field fiber is optically decoupled when the connector is not in use. In more detail, FIGS. 23-25 show a cross section view of exemplary connector 500 before and after mating with a second connector (represented for simplicity purposes by ferrule 590).

The field fiber end can be prepared by e.g., cutting, stripping, and cleaving (flat or angled). The prepared fiber end is then inserted into the collar body/housing, through an unactuated gripping device. The terminal end of the field fiber is positioned proximate to, but not in contact with the second end of the fiber stub (e.g., 117, 217). The actuating cap 544 of the gripping element can be pressed down onto the gripping element 542 (e.g., 142, 242) to actuate the gripping of the field fiber. In addition, in an alternative aspect, ferrule 532 can be configured similar to either ferrule 314 or ferrule 414 described above such that the abutting end faces of the fibers can be cleaned and/or polished prior to optical connection (either initial connection or subsequent connection) through the use of a polishing or cleaning strip. Also, when the field fiber is inserted though the gripping device into the ferrule, the terminal end may contact the cleaning or polishing strip. An air gap between the stub fiber 504 and field fiber 505 (of between about 0.005" to about 0.060", corresponding to the thickness of the cleaning/polishing strip) can be established to optically decouple the fibers until the connector 500 is mated in a receptacle.

Prior to mating, gripping element 540 is substantially secured within the collar body 520. The connectors are first mated as depicted in FIG. 24, where ferrule 590 of the second connector contacts ferrule 532 of connector 500 at an interface 592. At this contact interface, stub fiber 504 of the first connector and a fiber 506 of the second connector are also placed in contact. Spring 555 of connector 500 preloads a suitable force onto the connector body.

Figure 25:
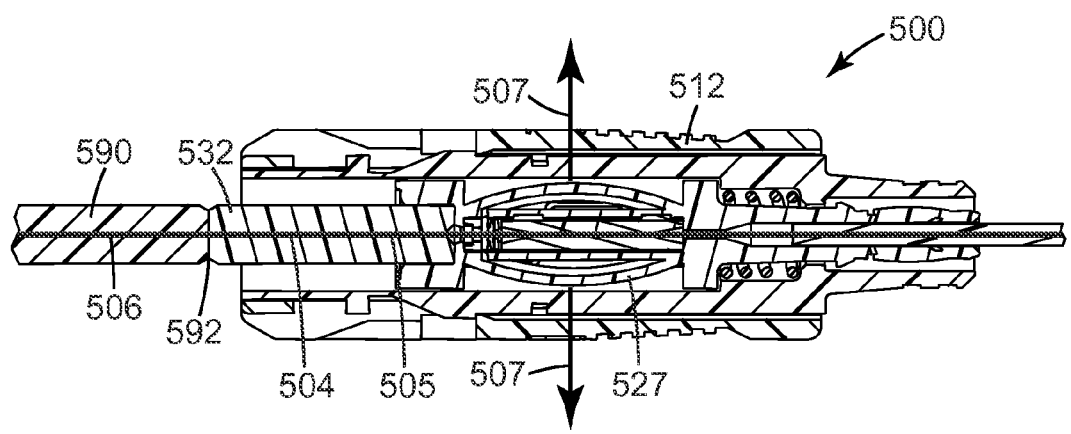

In FIG. 25, the ferrules 532 and 590 are brought into full contact force, with the tips of fibers 504 and 506 remaining flush with their respective ferrule end faces. Some of the contact force is applied by fiber 506 to the end face of the stub fiber 504. The remaining force of the mating presses onto ferrule 532, where part of the force applied to the ferrule 532 is transferred to the sidewalls 527 of the collar body 520, which bow outward in the direction of arrows 587. In addition, spring 555 will be compressed. Further, the ferrule 532 is translated slightly backward, bringing the second end of stub fiber 504 into contact with field fiber 505, thus providing a full optical coupling. When the two connectors are unmated, a gap is re-formed between fibers 504 and 505, thus preventing substantial transmission of light through the connector 500.

As mentioned above, the exemplary embodiments described herein provide an optical connector having a mechanism that can provide for a field terminated optical connector. The optical connectors described above can be used in many conventional optical connector applications such as drop cables and/or jumpers. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications. Moreover, the connectors described above are designed to be more insensitive to temperature changes and thus can be utilized in a larger range of applications, such as outside plant applications.

Various modifications, equivalent processes, as well as numerous structures to which the present invention may be applicable will be readily apparent to those of skill in the art to which the present invention is directed upon review of the present specification.

We claim:

1. An optical fiber connector, comprising:
   an outer housing;
   a collar body disposed in the outer housing, wherein the collar body receives and secures a ferrule in a first portion of the collar body, wherein the ferrule includes a central bore that defines an axis, the ferrule further having a fiber stub disposed in a portion of the central bore, the fiber stub comprising a first optical fiber having a first end proximate to an end face of the ferrule and a prepared second end terminating within the ferrule, wherein the collar body further includes a second portion that includes a housing portion to house a gripping device that grips a second optical fiber.

2. The optical fiber connector of claim 1, wherein the gripping device provides a contact force that is applied to the second optical fiber in an axial direction and provides optical contact with the second end of the first fiber inside the central bore.

3. The optical fiber connector of claim 2, wherein the gripping device includes a gripping element and an actuating cap configured to engage the gripping element to secure a second optical fiber disposed therein.

4. The optical fiber connector of claim 3, wherein the gripping element comprises a ductile material having a focus hinge that couples two element legs, wherein the actuating cap includes a cam portion formed on a cap leg that engages a rear portion of collar body upon actuation, wherein each of the legs further includes slots formed at different axial positions and oriented transverse to the axis, and wherein the gripping element further includes one or more projections located on opposite longitudinal end portions of the legs, wherein, upon actuation of the actuating cap, a first projection contacts a rear portion of the ferrule and a second projection contacts a portion of the actuating cap.

5. The optical fiber connector of claim 4, wherein contact force is from about 0.1 lbs. to about 0.4 lbs.

6. The optical fiber connector of claim 3, wherein the actuating cap includes a cover portion and a main body portion that includes two main legs and two spring legs, wherein the main legs include cams disposed on inner surfaces thereof to engage and clamp the element about the second optical fiber when the cap is pressed onto the element during actuation, wherein the main legs each include a forward shoulder portion to engage with a retaining wall portion of the collar body disposed between the gripping element and the ferrule, and wherein, during actuation, the spring legs engage with a cam surface of an opposite portion of the collar body.

7. The optical fiber connector of claim 1, wherein the ferrule includes a cut-out portion positioned at a generally midpoint axial location of the ferrule that provides a location to apply an adhesive to the central bore at a first portion of the ferrule.

8. The optical fiber connector of claim 1, wherein the ferrule includes a slot formed generally transverse to the axis that receives at least one of a cleaning material and a polishing material that is applicable at least one of to the second end of the first fiber and an abutting end of the second fiber.

9. The optical fiber connector of claim 8, wherein the slot is oriented at an angle of about 5°-about 10° from normal to the axis.

10. The optical fiber connector of claim 1, wherein the ferrule includes a through-hole intersecting and formed generally transverse to the central bore that receives at least one of a cleaning material and a polishing material that is applicable to at least one of the second end of the first fiber and an abutting end of the second fiber.

11. The optical fiber connector of claim 1, further comprising a cable holding member that includes a cable clamping mechanism disposable therein.

12. The optical fiber connector of claim 11, wherein the cable holding member further includes a main body and a retention clip, wherein the retention clip is configured to engage a portion of the main body of the cable holding member and secure the clamping mechanism, wherein the clamping mechanism includes a receptive groove formed therein having engaging projections configured to securely retain the outer portion of a fiber cable that houses the second optical fiber.

13. The optical fiber connector of claim 1, wherein the connector is configured as one of a plug-type connector and a socket-type connector.

14. The optical fiber connector of claim 1, wherein the outer housing is configured to mate with a receptacle.

15. An optical fiber connector, comprising:
   an outer housing; and
   a collar body disposed in the outer housing, wherein the collar body includes a flexible wall portion, wherein the collar body receives and secures a ferrule in a first portion of the collar body, wherein the ferrule includes a central bore that defines an axis, the ferrule further having a fiber stub disposed in a portion of the central bore, the fiber stub comprising a first optical fiber having a first end proximate to an end face of the ferrule and a prepared second end terminating within the ferrule, wherein the collar body further includes a second portion that includes a housing portion to house a gripping device that grips a second optical fiber, wherein the first and second fibers are optically coupled upon connection of the optical fiber connector to one of a connector coupling, a connector adapter and a connector socket.

16. The optical fiber connector of claim 15, wherein the flexible wall portion of the collar body comprises bowed outer side walls.

17. The optical fiber connector of claim 15, wherein the flexible wall portion of the collar body comprises a resilient material forming a portion of the side walls.

18. The optical fiber connector of claim 15, wherein the connector is configured as one of a plug-type connector and a socket-type connector.

19. The optical fiber connector of claim 15, wherein the outer housing is configured to mate with a receptacle.

* * * * *

UNITED STATES PATENT AND TRADEMARK OFFICE
CERTIFICATE OF CORRECTION

PATENT NO. : 8,118,494 B2
APPLICATION NO. : 12/527217
DATED : February 21, 2012
INVENTOR(S) : Donald K Larson It is certified that error appears in the above-identified patent and that said Letters Patent is hereby corrected as shown below:

Title Page,
After Item [87], please insert the following Domestic Priority data which is stated on the Filing Receipt but does not appear on the printed patent:

Item -- [60], Related U.S. Application Data
Provisional application No. 60/890,378, filed on February 7, 2008. --

Signed and Sealed this
Twenty-ninth Day of May, 2012

David J. Kappos
*Director of the United States Patent and Trademark Office*